US006935003B2

(12) United States Patent
Rahman et al.

(10) Patent No.: US 6,935,003 B2
(45) Date of Patent: Aug. 30, 2005

(54) COMPOUND FABRICATION PROCESS AND APPARATUS

(75) Inventors: Mustafizur Rahman, Chip Bee Garden (SG); Wong Yoke San, Singapore (SG); A. Senthil Kumar, Kent Vale (SG); Poo Aun Neow, Singapore (SG); Lim Han Seok, Singapore (SG); Shinichi Miyazawa, Tsukuba (JP)

(73) Assignee: National University of Singapore, Singapore (SG)

( * ) Notice: Subject to any disclaimer, the term of this patent is extended or adjusted under 35 U.S.C. 154(b) by 83 days.

(21) Appl. No.: 10/377,140

(22) Filed: Feb. 28, 2003

(65) Prior Publication Data

US 2004/0168288 A1 Sep. 2, 2004

(51) Int. Cl.[7] .............................. B23P 23/00; B23H 5/04; B23H 5/06
(52) U.S. Cl. ..................... 29/27 C; 29/35.5; 29/564; 219/69.15; 219/69.11; 219/69.17; 205/663; 205/686
(58) Field of Search .................. 29/26 A, 27 R, 29/28, 27 C, 563, 564, 35.5, 39, 40, 33 P; 219/69.11, 69.17, 69.2, 69.15; 205/640, 651, 662–663, 686; 409/202, 212

(56) References Cited

U.S. PATENT DOCUMENTS

| | | | | |
|---|---|---|---|---|
| 3,646,306 A | * | 2/1972 | Olds | 219/70 |
| 3,998,127 A | | 12/1976 | Romeu | |
| 4,392,110 A | * | 7/1983 | El-Menshawy et al. | 324/453 |
| 4,459,190 A | * | 7/1984 | Inoue | 219/69.17 |
| 4,483,755 A | * | 11/1984 | Heck et al. | 204/212 |
| 4,646,422 A | | 3/1987 | McMurtry | |
| 4,706,371 A | | 11/1987 | McMurtry | |
| 4,711,016 A | * | 12/1987 | Genschow et al. | 29/27 C |
| 4,992,639 A | * | 2/1991 | Watkins et al. | 219/69.17 |
| 5,006,685 A | * | 4/1991 | Hatano et al. | 219/69.17 |
| 5,038,012 A | * | 8/1991 | Walter | 219/69.15 |
| 5,091,622 A | * | 2/1992 | Ohba | 219/69.17 |
| 5,117,552 A | | 6/1992 | Babel | |
| 5,246,555 A | * | 9/1993 | Takayama | 204/217 |
| 5,396,040 A | * | 3/1995 | Girardin | 219/69.15 |
| 5,429,461 A | * | 7/1995 | Mukherjee et al. | 29/33 P |
| 5,439,431 A | | 8/1995 | Hessbruggen et al. | |

FOREIGN PATENT DOCUMENTS

| | | | | |
|---|---|---|---|---|
| DE | 3128403 A1 | * | 2/1983 | |
| DE | 3902612 A1 | * | 8/1989 | |
| GB | 2229658 A | * | 10/1990 | |
| JP | 5-8136 A | * | 1/1993 | |
| WO | WO-02/00390 A1 | * | 1/2002 | |

\* cited by examiner

*Primary Examiner*—Erica Cadugan
(74) *Attorney, Agent, or Firm*—Dinsmore & Shohl LLP

(57) ABSTRACT

A miniature machine tool for micro-machining is capable of performing on a workpiece at least one conventional mechanical machining operation and another micro-machining operation such as electrochemical machining (ECM), electro deposit machining (EDM), micro-milling or micro-turning or micro-drilling. The machine tool includes a holder in which the workpiece is clamped during all successive machining operations so that the machining operations may be performed in succession without intervening reclamping of the workpiece. This increases dimensional accuracy when micro-machining high-precision components.

5 Claims, 8 Drawing Sheets

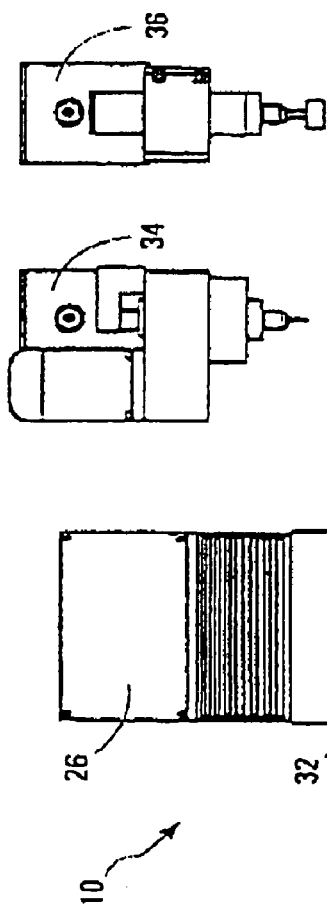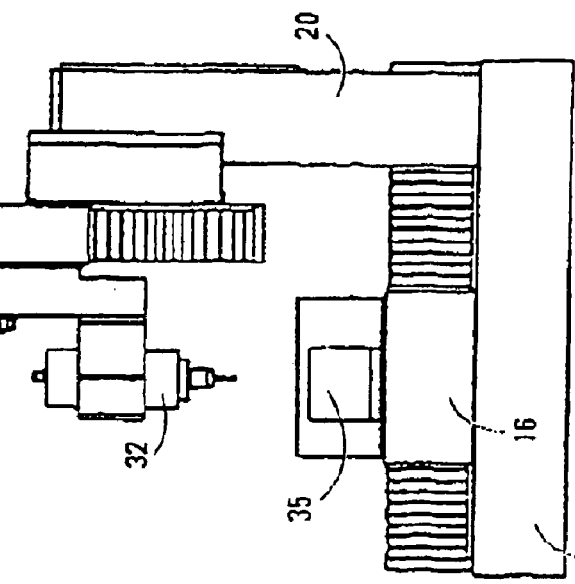

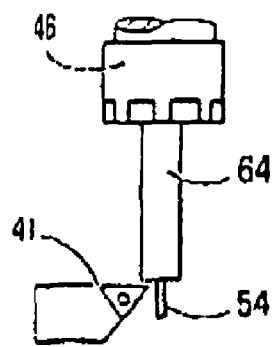 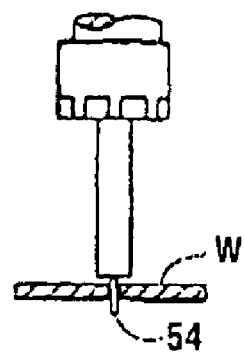
FIG. 10A     FIG. 10B
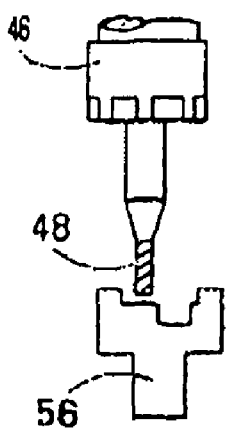 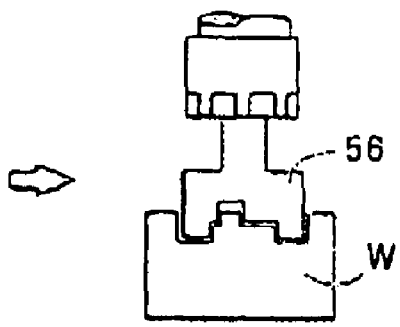
FIG. 11A     FIG. 11B
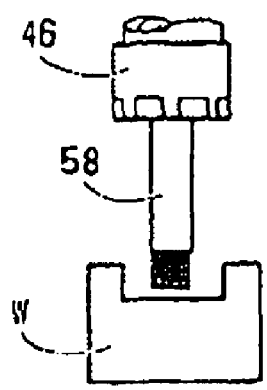 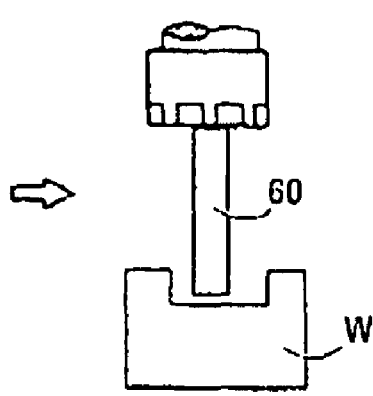
FIG. 12A     FIG. 12B

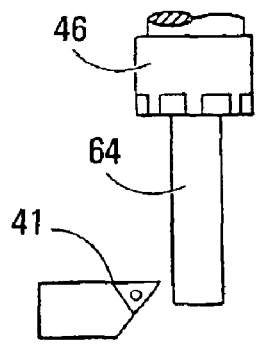
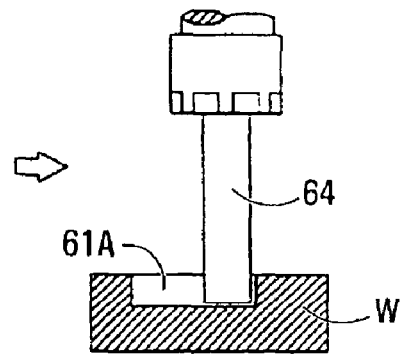
FIG. 13A  FIG. 13B
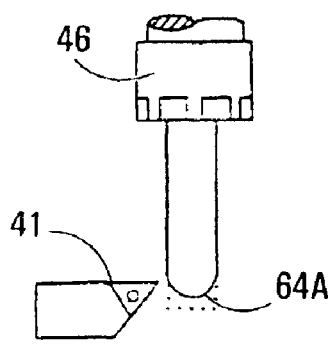
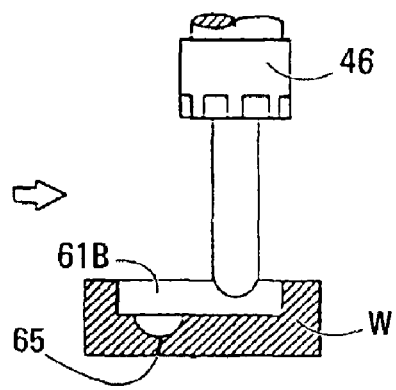
FIG. 14A  FIG. 14B
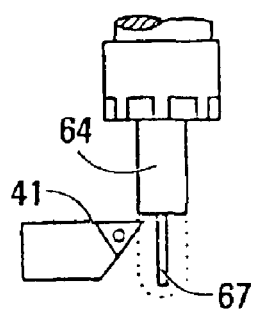
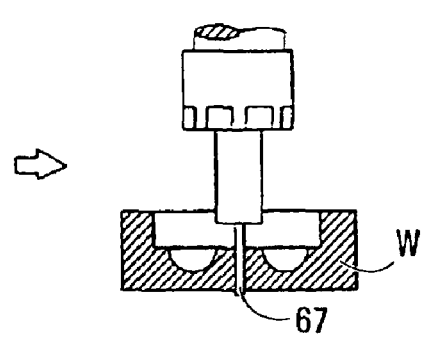
FIG. 15A  FIG. 15B

COMPOUND FABRICATION PROCESS AND APPARATUS

BACKGROUND OF THE INVENTION a) Field of the Invention

This invention relates to a new or improved compound fabrication process and apparatus therefor, and in particular to the development of a miniature machine tool for manufacture of micro, high precision components.

b) Description of the Prior Art

In general, conventional machine tools are used to manufacture micro components. Usually the manufacture of such micro components requires multiple machining processes such as micro Electrode Discharge Machining (EDM), micro Electro Chemical Machining (ECM), micro milling, micro turning and micro drilling. Therefore to manufacture a simple part may entail use of more than one machine, depending on the geometry of the workpiece. For example to machine a micron sized hole in a workpiece one may have to first machine an electrode using turning, milling or other processes. The machined electrode will have to be placed in the spindle of an EDM machine to machine the micron-sized hole. During this process, if the electrode is not properly aligned on the spindle with respect to the workpiece there is a possibility of producing an inaccurate hole because of the set-up and machine errors. The prior art does not address the problem of combining multiple processes on a single set-up, but is confined to simple single process machines such as those disclosed in U.S. Pat. No. 3,998,127, U.S. Pat. No. 5,439,431, U.S. Pat. No. 4,706,371, U.S. Pat. No. 4,646,422, U.S. Pat. No. 5,117,552.

The above mentioned references do not cover any method or means for combining conventional processes such as milling, turning, etc. with non-conventional processes such as Electrode Discharge Machining or Electro Chemical Machining. Therefore when conventional and non-conventional processes must be applied in succession there arises the possibility of inaccuracies in alignment of workpieces due to the fact that they have to be repositioned for conventional and non-conventional machining. These problems are particularly acute in the case of micro machining where the dimensional tolerances are very small. To minimize such inaccuracies, the present inventors have appreciated that it would be desirable to perform multiple manufacturing or fabrication processes in a single machine and thus avoid the manufacturing inaccuracies which are inherent in multi-stage processing operations.

SUMMARY OF THE INVENTION

The objective of the invention is to provide an improved fabrication process and apparatus through which multiple manufacturing steps can be performed on a single platform without re-gripping of the workpiece so that very significant improvements can achieved in terms of the dimensional accuracy of the workpiece being produced.

The invention provides a miniature machine tool for performing on a workpiece at least one conventional mechanical machining operation and at least another machining operation selected from electrochemical machining (ECM) and electro deposit machining (EDM); said machine tool including a holder in which said workpiece is clamped during said machining operations; wherein said machine tool is configured to perform said machining operations in succession without intervening reclamping of the workpiece.

For example the machine can be a micro scale universal milling machine in which various conventional forming operations such as turning, milling, drilling, shaping polishing and grinding can be performed as is known, and wherein it is also possible to perform non-conventional machining processes such as Electro Discharge Machining and Electro Chemical Machining. For example the machine tool can be used to manufacture an electrode by known mechanical material removing processes and then used carry out a micro Electro Discharge Machining operation with the electrode. The equipment can also be used to carry out Electro Chemical Machining operations on milled or turned workpieces, or to perform electro discharge manufacturing on workpieces to improve surface finish and accuracy. No machine in the prior art has the capability to perform all the above listed steps on a workpiece.

A preferred apparatus for carrying out the invention comprises a miniature universal milling machine having a machine frame formed by a gantry structure having two spaced vertical pillars connected at their upper ends by a crosshead beam which supports a carriage on which tooling such as a universal milling head can be adjusted horizontally and vertically. A machine bed positioned in a lower part is arranged to be adjustable in a horizontal plane and also vertically. The machine is capable of supporting various driven spindles which can carry tools for performing milling, drilling, grinding etc. operations.

The invention also provides a method of fabricating a workpiece in a miniature machine tool as described above, the method comprising the steps of: providing a workpiece blank and clamping said workpiece blank in said holder; performing a first conventional mechanical machining operation on said workpiece blank; and without re-gripping of said workpiece blank performing a second machining operation therewith, said second machining operation being selected from ECM and EDM.

Typically the conventional mechanical machining operation will be performed on the workpiece first followed by the second machining operation involving ECM or EDM, but in principle the order of these operations could be reversed.

BRIEF DESCRIPTION OF THE DRAWING FIGURES

The invention will further be described, by way of example only, with reference to the accompanying drawings wherein:

FIG. 3 is a front elevation of the machine tool illustrating a different tooling configuration;

FIG. 4 is a right side elevation corresponding to FIG. 3;

FIG. 5 illustrates three further tooling configurations which can be used in the machine tool;

FIGS. 6, 7, 8 and 9 are schematic views illustrating mechanical machining operations that can be performed in the machine tool of FIGS. 1 to 4; and FIGS. 10, 11 and 12 are schematic views illustrating two-stage compound machining operations that can be performed; and FIGS. 13, 14 and 15 are views illustrating the manufacture of a component through a series of successive two-stage compound machining operations.

Figure 16:
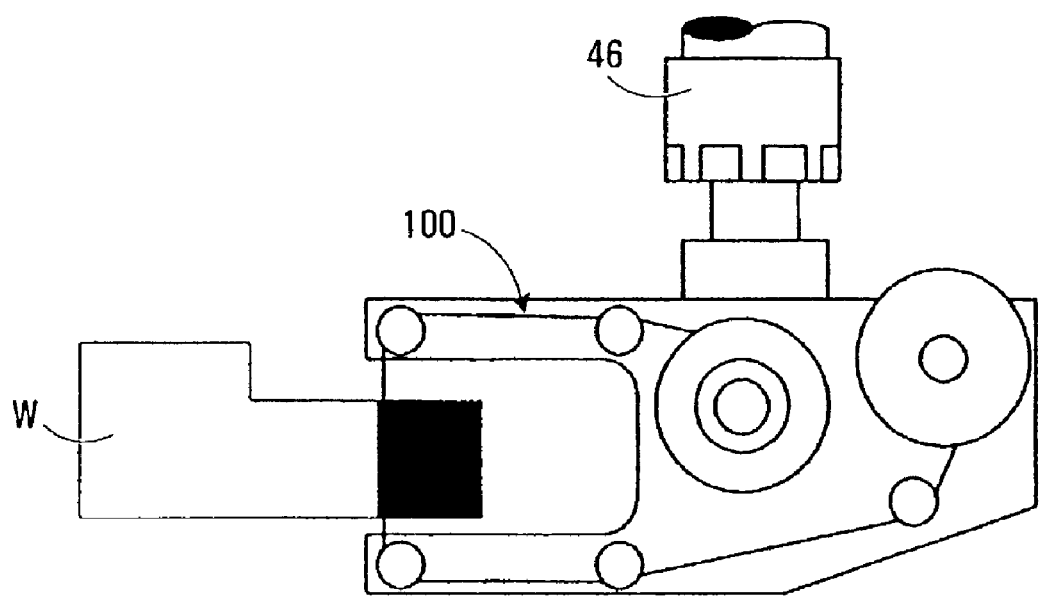

FIG. 16 illustrates the wire EDM attachment that can be used in the machine tool of FIGS. 1 to 4.

Figure 17:
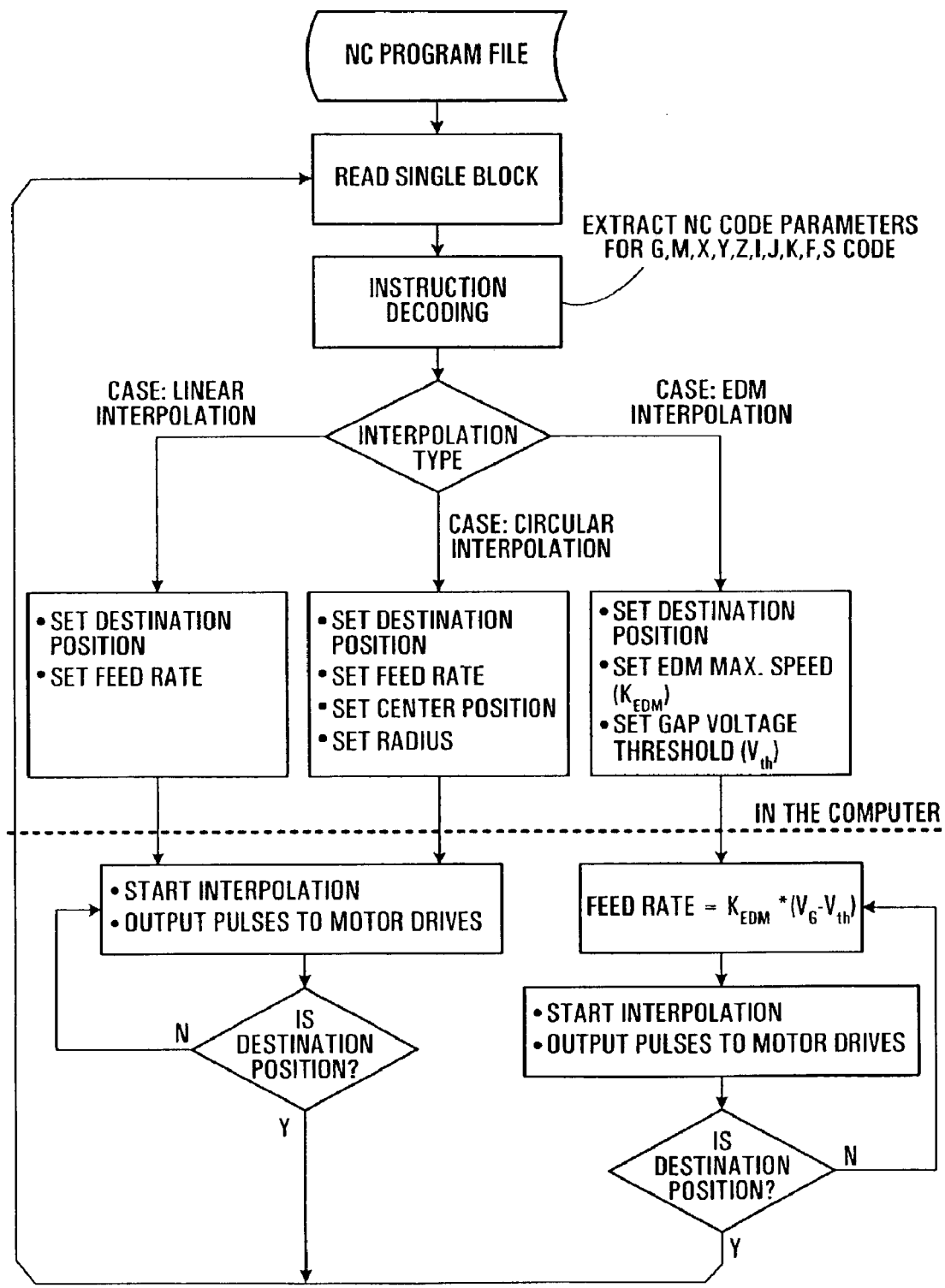
Figure 18:
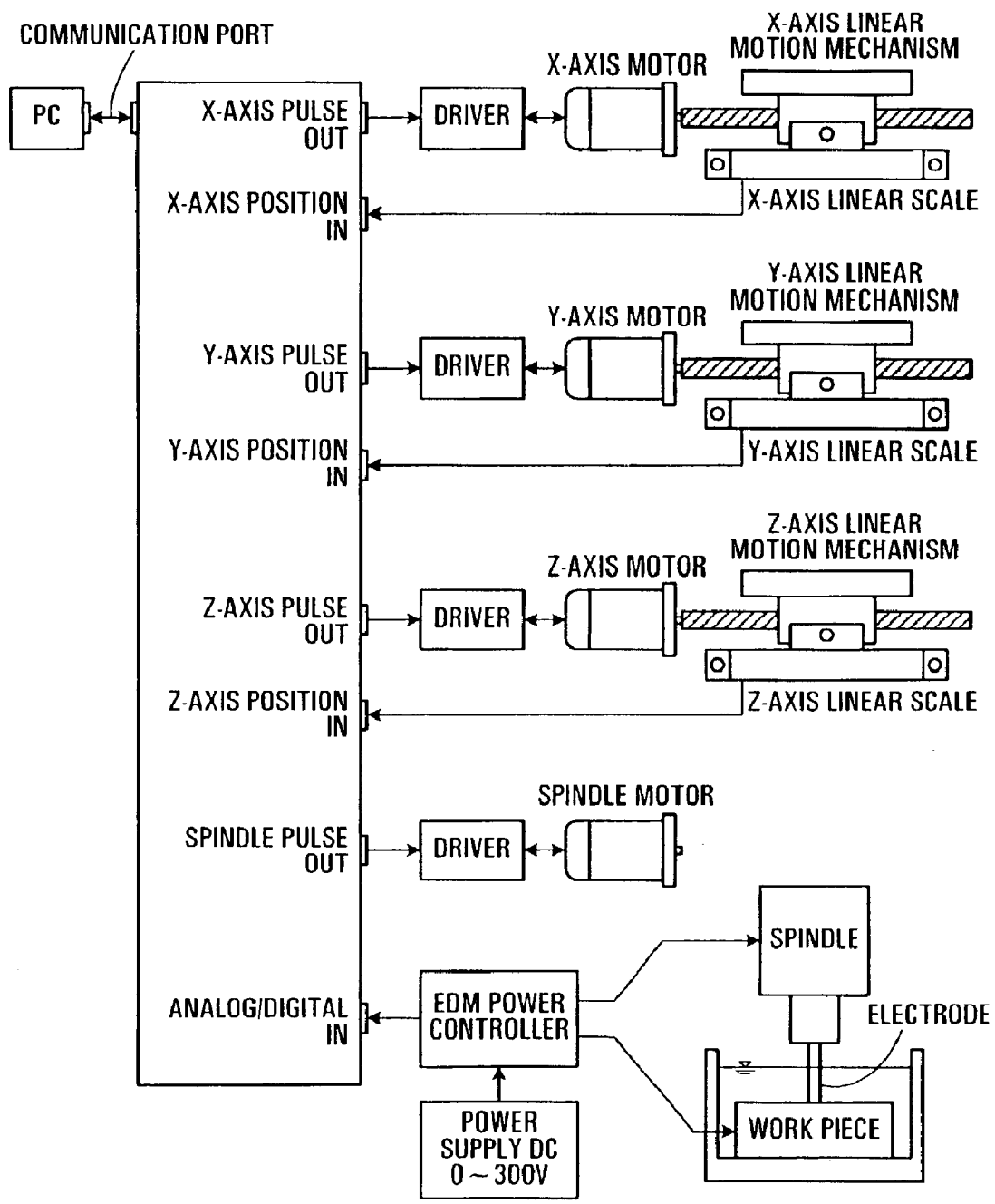

FIGS. 17 and 18 illustrate the operation of the numerical control system and how it is integrated to the machine.

DESCRIPTION OF THE PREFERRED EMBODIMENTS

Figure 2:
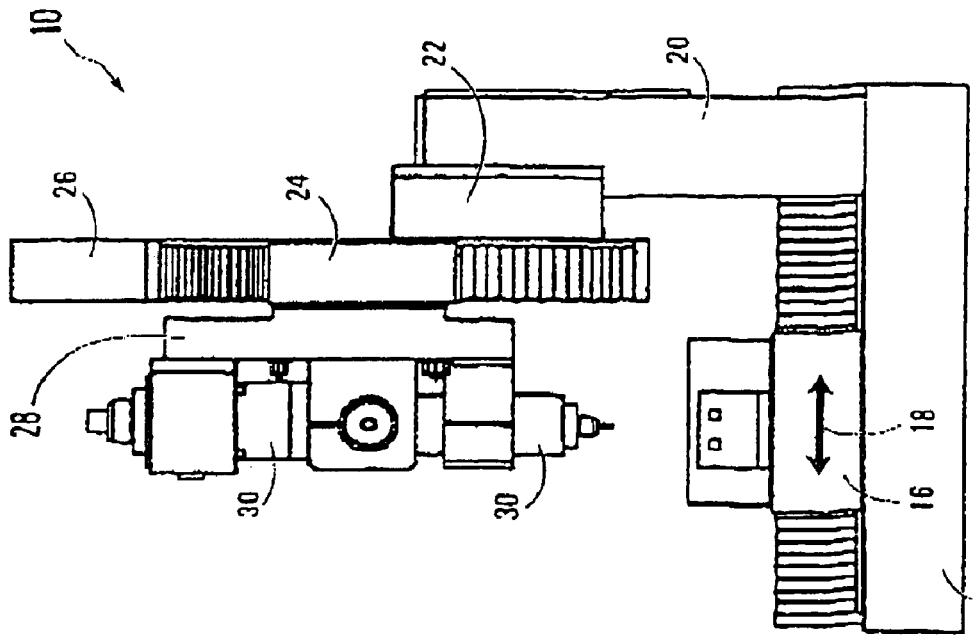
FIG. 2 is a right side elevation of the machine tool of FIG. 1.
Figure 1:
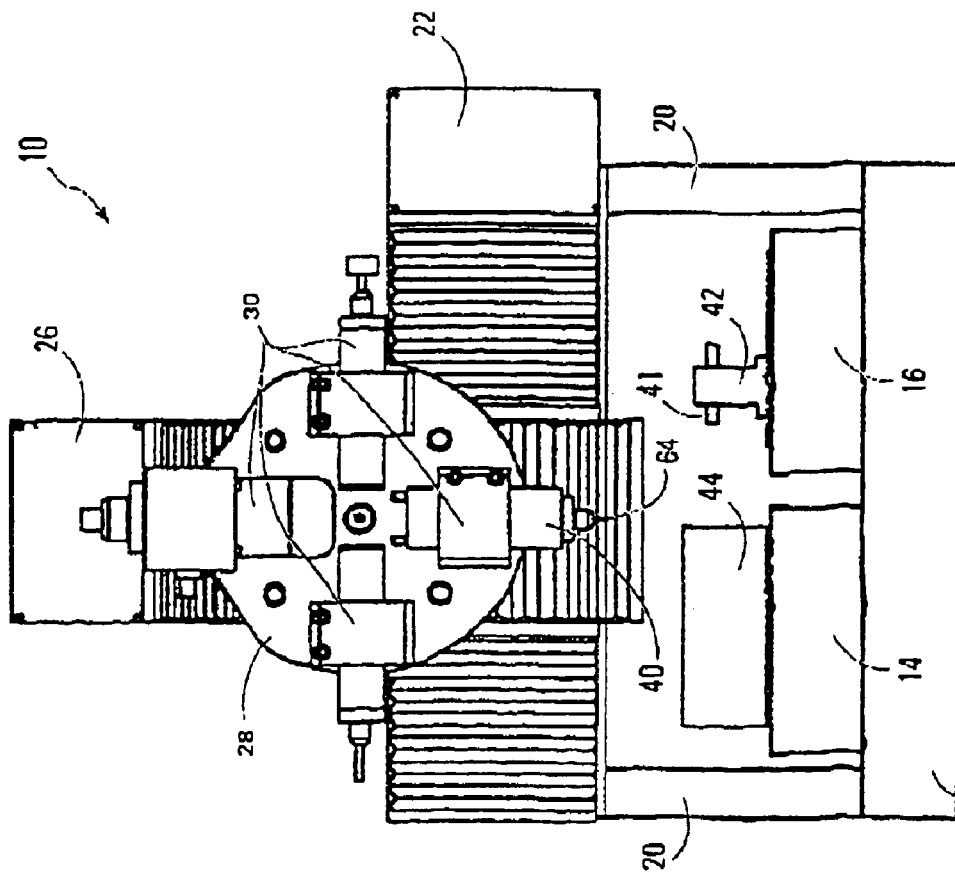
FIG. 1 is a somewhat schematic front elevation of a miniature machine tool equipped for carrying out the method of the present invention.

As shown in FIG. 1, a machine tool 10 in accordance with the invention comprises a base frame 12 upon which is supported a pair of beds 14, 16 each of which is independently moveable under a controlled drive system (not shown) to move in the fore-and-aft direction of the machine tool as indicated by the arrow 18 in FIG. 2. Each of the beds 14 and 16 as will be more fully explained hereafter forms one component of a machining station for carrying out operations on workpieces.

Rigidly attached to the base frame 12 are a pair of laterally spaced vertical pillars 20 the upper ends of which are rigidly connected to opposite ends of a horizontal crossbeam 22 which spans the width of the base frame as seen in FIG. 1.

In known manner, the crossbeam provides a horizontal guide for movement of a carriage 24 thereon, this carriage in turn providing guidance for vertical movement of a linear slide 26 therein. The linear slide in turn provides a mounting for various tooling or work gripping components such as the indexing head 28 shown in FIGS. 1 and 2.

The basic machine tool configuration described above is not disclosed in any detail since it is well understood by those skilled in the art. It will be seen that the indexing head 28 accommodates four replaceable tooling or gripper sets 30 extending at angular intervals of 90° thereon.

In known manner the machine tool includes drive means selectively engageable to apply a powered drive for rotation of a selected one of the tooling sets/grippers 30 when it is desired to perform a mechanical machining process on a workpiece. As is known in such machine tools, the mechanical machining process can be selected from drilling, milling, shaping, turning, grinding, and polishing.

In the machine tool as illustrated in FIG. 3, the indexing head 28 is replaced by a drill head 32, and depending upon the requirements it could equally well be replaced by the components shown in FIG. 5 namely (a) a milling head 34, (b) a polishing head 36, or (c) a grinding head 38.

FIG. 1 shows the machine tool 10 configured to perform in succession a turning operation and an EDM or ECM operation. In this set-up the downwardly directed tool holder 30 is configured to grip an electrode workpiece 64 in a power driven rotatable holder 40 to be machined by turning, metal removal being performed by a cutting tool 41 held in a tool mount 42 carried on the bed 16. By suitable manipulation of the relative positions of the electrode workpiece 64 and the tool mount 42, a required turning operation can be performed on the electrode workpiece 64 as it is rotated by the holder 40. Thereafter, while still engaged within the holder 40, the electrode workpiece 64 can be transferred to the location of a tank 44 (carried on the left hand bed 14 as seen in FIG. 1) for the performance therein of an EDM or an ECM operation. The workpiece to be machined by EDM or ECM is placed in the tank 44 and the electrode workpiece 64 is used for machining the workpiece in tank 44. Separate tanks are used for EDM and ECM operations. For EDM operation, the tank 44 is filled with dielectric medium whereas for ECM operations the ECM tank 44 will be filled with electrolyte. The use of two different delivery systems avoids the possibility of cross contamination.

FIG. 3 shows the machine tool 10 set up to perform a micro milling operation on the workpiece. The milling tool is held in a gripper 35 that is mounted on the linear slide 26, the workpiece then being brought into the vicinity of the milling tool 37 held in the milling head, the relative positions of the tool 37 and the workpiece W being manipulated as the workpiece is rotated to effect the desired milling operation.

Figure 6:
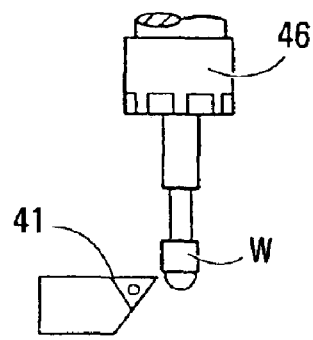
Figure 7:
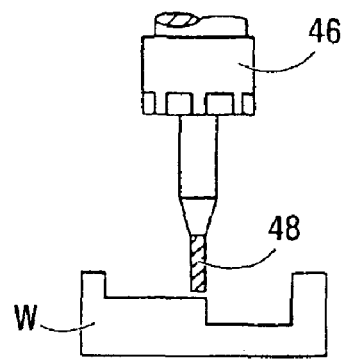

FIG. 6 shows an alternative machining operation wherein the rotating spindle 46 carries the workpiece for machining by the tool 41.

Figure 8:
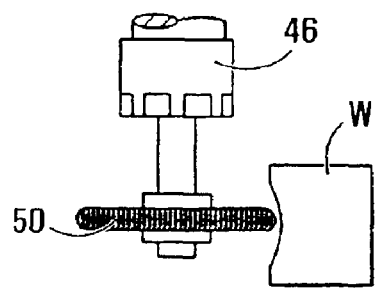

FIG. 8 shows the rotating spindle 46 carrying a grinding wheel 50 for performing a grinding operation on the stationary workpiece W.

Figure 9:
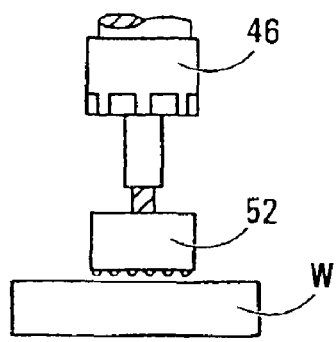

FIG. 9 shows the rotating spindle 46 carrying a polishing tool 52 for performing a polishing operation on the workpiece W.

FIG. 10 illustrates two operations to effect hybrid machining for forming micro holes. In FIG. 10a the electrode workpiece 64 held in the driven spindle 46 is machined by the turning tool 41 to produce an electrode 54. In a subsequent step as indicated in FIG. 10b the electrode 54 is then used in a micro EDM operation to produce a hole in a workpiece W.

FIG. 11 illustrates a milling tool 48 held in the driven spindle 46 and manipulate to cut a desired profile in an electrode 56. The electrode is then inverted as shown in FIG. 11b and used in an EDM process to shape the workpiece W.

As shown in FIG. 12a the spindle 46 first holds an electrode 58 used in an EDM process to act upon a workpiece W. In a subsequent operation as shown in FIG. 12b the workpiece is further processed in an ECM operation by an electrode 60.

The hybrid machining operations described in the foregoing in relation to the apparatus shown in the drawings provide the main advantage that they enable the machining of micro components of great accuracy without changing the machine set up. For example an electrode machined by micro turning or micro milling can be further processed by micro ECM (electrical chemical machining) to improve its surface smoothness and dimensional accuracy, and this same electrode can then be used in a micro EDM operation to reconfigure functional components. In these means errors which could otherwise arise due to clamping or set up tolerances can be eliminated.

It will be appreciated that various other hybrid micro machining operations can be performed by combining selected operations to ensure that workpieces are produced with improved dimensional accuracy. For examples FIGS. 13, 14 and 15 illustrate successive steps in a hybrid machining process for producing in a workpiece W a mould cavity configuration as shown in the right hand view of FIG. 15. Initially, as shown in FIG. 13 a turning tool 41 is employed to produce the desired dimensions of an electrode 64 that is rotated in the driven spindle 46. Thereafter this electrode 64 is employed to produce in the workpiece W a preliminary cavity 61a corresponding to the profile of the electrode.

Subsequently, as shown in FIG. 14, without removing the electrode 64 from the spindle 46, the lower end of the electrode is rounded as at 64a by the turning tool 41, whereafter the spindle 46 is used to transfer the modified electrode to produce by an EDM process rounded depressions 65 providing a modified recess 61b in the workpiece W.

In a further stage as shown in FIG. 15 the turning tool 41 is again used to reconfigure the electrode 64 to provide a small diameter extension 67. This extension 67 is then used as shown in the right hand part of FIG. 15 to produce by an ECM process a central hole through the workpiece W.

As depicted in FIG. 16, a portable wire EDM 100 can be attached to the spindle 46. The wire EDM 100 is driven by a motor which makes the wire move around. The attachment can be tilted to any angle in order to produce slots of any angle. One such arrangement to produce a slot using the wire EDM attachment is shown in FIG. 16.

Movements of the various components of the machine tool are driven under a program provided by a central processing unit connected to a numerically controlled system which can be designed to carry out various hybrid machining processes in predetermined combinations. FIGS. 17 and 18 are flow-charts showing the system logic for numerically controlled machining.

Briefly stated, the machine tool and the processes described above deliver at least the following advantages:

1. By virtue of the gantry structure of the micro machine tool the stability of the various components in the machine is enhanced and the dimensional accuracy of resulting workpieces is therefore improved.
2. The described system provides the capability to machine micro components using conventional and non-conventional hybrid machining processes which can include two or more of the following: micro milling; micro turning; micro EDM; micro ECM; micro polishing; and micro grinding, all performed on the same machine tool.
3. The system provides the capability of manufacturing non-cylindrical EDM and/or ECM electrodes in the single tool.
4. The system provides the capability of using EDM or ECM electrodes produced therein without changing the machine set up.
5. The system provides the capability of performing wire cut EDM using a portable attachment.

What is claimed is:

1. A machine tool for performing on a first workpiece at least one conventional mechanical machining operation and on a second workpiece at least another machining operation selected from electrochemical machining (ECM) and electro discharge machining (EDM) using said first workpiece as an electrode, comprising; a first workpiece gripper and a second workpiece gripper in which said workpieces are clamped during said machining operations;

a rigid machine frame having a horizontally oriented bed, a pillar structure rigidly attached to said bed and extending vertically therefrom, and a gantry supported on said pillar structure and extending horizontally;

a first carriage guided for movement on said gantry in a first horizontal direction;

a second carriage carried by said first carriage and guided thereon for movement vertically;

a third carriage supported by said second carriage;

a fourth carriage mounted on said machine frame bed and guided for movement thereon in a horizontal direction that is perpendicular to said first horizontal direction;

said fourth carriage being configured to support a tool;

a fifth carriage mounted on said machine frame bed and guided for movement thereon in a horizontal direction that is perpendicular to said first horizontal direction;

positioning drive means connected to each said carriage to effect changes in the position of the associated carriage;

said first workpiece gripper being carried in said third carriage and supporting the first workpiece;

a tool holder carried in said fourth carriage;

the second workpiece gripper being carried in said fifth carriage and supporting the second workpiece; and a machining drive connected and selectively operable with said positioning drive means to effect relative movement between said tool holder and said second workpiece with respect to the first workpiece carried in said first workpiece gripper to effect said machining operations on said workpieces in at least first and second locations in said machine tool in succession without intervening reclamping of the workpieces.

2. The machine tool as claimed in claim 1 wherein said mechanical machining operation is selected from milling, turning, grinding and polishing.

3. The machine tool as claimed in claim 1 wherein said pillar structure comprises a pair of laterally spaced vertical pillars, each said pillar having a lower end that is rigidly connected to said bed and an upper end;

said gantry comprising a horizontal beam having opposite ends which are rigidly affixed to the upper ends of said respective pillars;

said positioning drive means comprising powered drive systems connected to each of said movable carriages to effect precisely controlled movements of said carriages;

said powered drive systems being operated under control of a central processor unit which is programmable to effect a predetermined sequence of movements in performing the selected machining operations on the workpieces.

4. A method of fabricating a workpiece comprising:

providing the machine tool as claimed in claim 1;

providing a first workpiece blank and clamping said first workpiece blank in said first workpiece gripper;

performing a first conventional mechanical machining operation on said first workpiece blank;

and without re-gripping of said first workpiece blank, performing a second machining operation on a second workpiece blank using said machined first workpiece as an electrode, said second machining operation being selected from ECM and EDM.

5. A method as claimed in claim 4 wherein said at least one conventional mechanical machining operation is selected from drilling, milling, turning, grinding, and polishing.

* * * * *